United States Patent
Longo et al.

[15] 3,705,477
[45] Dec. 12, 1972

[54] CONDENSATE ANALYZER

[72] Inventors: John F. Longo, Brooklyn, N.Y.;
Joseph H. Duff, Basking Ridge, N.J.

[73] Assignee: Ecodyne Corporation

[22] Filed: Feb. 8, 1971

[21] Appl. No.: 113,523

[52] U.S. Cl. ..................55/18, 55/52, 55/68, 210/25, 324/30 B
[51] Int. Cl. ..................................................B01d
[58] Field of Search............55/18, 19, 52, 53, 68, 44, 55/74, 196, 233, 244, 256; 210/25, 26, 37, 38, 96, 188; 261/94, 95; 324/30 B

[56] References Cited

UNITED STATES PATENTS

| | | | |
|---|---|---|---|
| 3,458,438 | 7/1969 | Smith et al. | 210/38 X |
| 2,834,466 | 5/1958 | Hament | 55/196 X |
| 3,505,784 | 4/1970 | Hochgesand et al. | 55/44 |
| 2,938,868 | 5/1960 | Carlson et al. | 210/25 |
| 2,807,582 | 9/1957 | Applebaum | 210/26 |
| 2,606,870 | 8/1952 | Pemberton et al. | 210/26 |
| 2,617,766 | 11/1952 | Emmett et al. | 210/25 |
| 2,711,995 | 6/1955 | Sard | 210/25 |

*Primary Examiner*—Samih N. Zaharna
*Assistant Examiner*—R. W. Burks
*Attorney*—Charles M. Kaplan and Joel E. Siegel

[57] ABSTRACT

A method and apparatus for stripping carbon dioxide from a liquid for use in measuring true acid conductivity of boiler feed condensate. The condensate is passed through a standard Larson-Lane column connected in series with a column, packed with an inert packing material. An inert gas is bubbled through the packed column to displace the carbon dioxide by mechanical action.

6 Claims, 4 Drawing Figures

INVENTORS.
JOSEPH H. DUFF
JOHN F. LONGO
BY Joel E. Siegel
Attorney.

INVENTORS.
JOSEPH H. DUFF
JOHN F. LONGO
BY Joel E. Siegel
Attorney.

CONDENSATE ANALYZER

BACKGROUND OF THE INVENTION

This invention relates to a method and apparatus for stripping carbon dioxide from a liquid and more particularly to a method and apparatus for measuring true condensate acid conductivity for use in detecting air leaks in an electrical power generation system and for use in determining when anion resin used to remove impurities from the boiler feed water has become exhausted.

It is well known that boiler feed water used in a steam generating system for an electrical power plant requires an exceptionally high degree of purity. In the environment of high temperature steam, small amounts of impurities or contaminants, such as metallic salts, undissolved solids and silica and the like, in the boiler feed water can cause scale, sludge and corrosive deposits in the steam generating system. In the turbine the ensuing pitting, erosion, or build-up of deposits will cause a reduction of turbine efficiency. In an effort to avoid these deleterious effects, the water initially introduced into the system and the boiler make-up feed water subsequently introduced into the system are purified by a method and apparatus of the type disclosed in U.S. Pat. No. 3,250,705, assigned to the assignee of the present invention. This method includes passing the water through a bed or beds of anion and cation exchange resin particles. Eventually the resins become exhausted and must be regenerated or discarded.

The present invention provides a method of detecting air leaks into the power generation system. Air entering the system has several detrimental effects among them being increasing the rate of exhaustion of the anion resin due to the carbon dioxide contained in the air. As the carbon dioxide passes through the demineralizer it is removed by the anion resin in the form of carbonate ions and thus reduces the ability of the anion resin to remove other anions from the feed water. The present invention further provides a method to indicate when the anion resin has become exhausted. In the past the anion resin has been discarded on a fixed time cycle which may result in the removal of resin prior to exhaustion, thus anion resin is wasted, or may result in discarding the anion resins after they have become exhausted, and thus damaging impurities have been allowed to pass through. Both the method of detecting air leaks and the method of indicating anion resin exhaustion of the present invention require an accurate measurement of the acid conductivity of the condensate.

In order to measure the true acid conductivity, especially in condensate applications where the concentrations are low, dissolved carbon dioxide must be removed from the sample in order to measure the conductivity due to anionic constituents. The mechanical gas scrubber of the present invention, used to remove dissolved carbon dioxide is an improvement of the Beckman Instruments, Inc. Model CH-33 Larson-Lane Condensate Analyzer. The Beckman unit consists of a standard Larson-Lane Cation Column, filled with H+ Form cation resin, followed by a scrubber column having a sintered metal gas diffusser in the bottom. The tubing is arranged so that the flow passes in series through the two columns. Prepurified nitrogen is bubbled through the diffuser into the scrubber tube to displace the carbon dioxide molecules with nitrogen molecules by mechanical action. The Beckman instrument when tested did not give satisfactory results for the use contemplated above. A specific laboratory experiment will hence forth be described in detail.

SUMMARY OF THE INVENTION

It is the principle object of the present invention to provide an improved method and apparatus for removing dissolved carbon dioxide from a liquid.

Another object is to provide a method and apparatus to more accurately measure the conductivity of a liquid due to anionic constituents.

A further object is to provide a method and apparatus for detecting air leaks in a steam generating system for an electrical power plant.

A still further object is to provide a method and apparatus for determining if the anion resin in a demineralizer is exhausted.

The present invention provides a condensate analyzer comprising a standard Larson-Lane hydrogen cation column having a gas scrubber connected to the outlet thereof. The gas scrubber comprises a column packed with an inert packing material and means to pass prepurified nitrogen gas upstream therethrough. A conductivity cell is provided to measure the conductivity of the effluent from the carbon dioxide scrubber. Air leaks within a steam generation system are detected by taking a liquid sample up steam from the demineralizer and passing it through the condensate analyzer of the present invention. By comparing the conductivity of the scrubber influent to the conductivity of the scrubber effluent the quantity of carbon dioxide present in the system may be determined. The condensate analyzer of the present invention may also be used to indicate anion resin exhaustion by comparing the true acid conductivity of the demineralizer influent and effluent. When the acid conductivity of the influent is substantially equal to the acid conductivity of the effluent the anion resin is no longer removing anions.

DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which.

DESCRIPTION OF THE PREFERRED EMBODIMENTS

Figure 1:
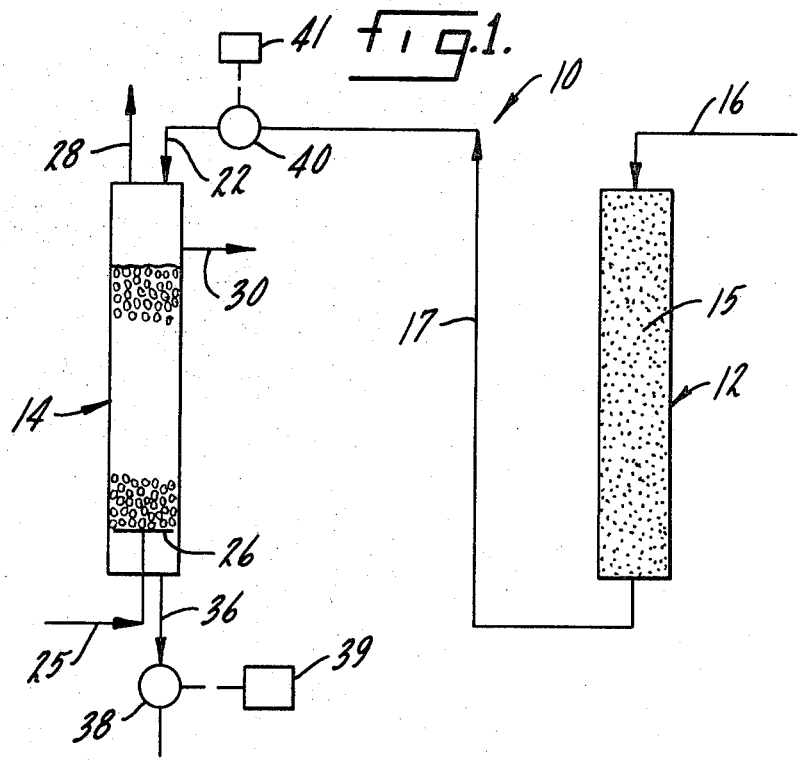
FIG. 1 is a schematic showing of the invention.

The condensate analyzer of the present invention is illustrated schematically in FIG. 1 at 10. Analyzer 10 comprises a standard Larson-Lane hydrogen cation column 12 and an improved gas scrubber 14, which forms an important part of the invention. Column 12 is filled with a cation resin 15, preferably of the hydrogen form, and has an influent conduit 16 and an effluent conduit 17 associated therewith. Condensate passing through the resin 15 is stripped of ammonia and other cations contained therein.

Figure 2:
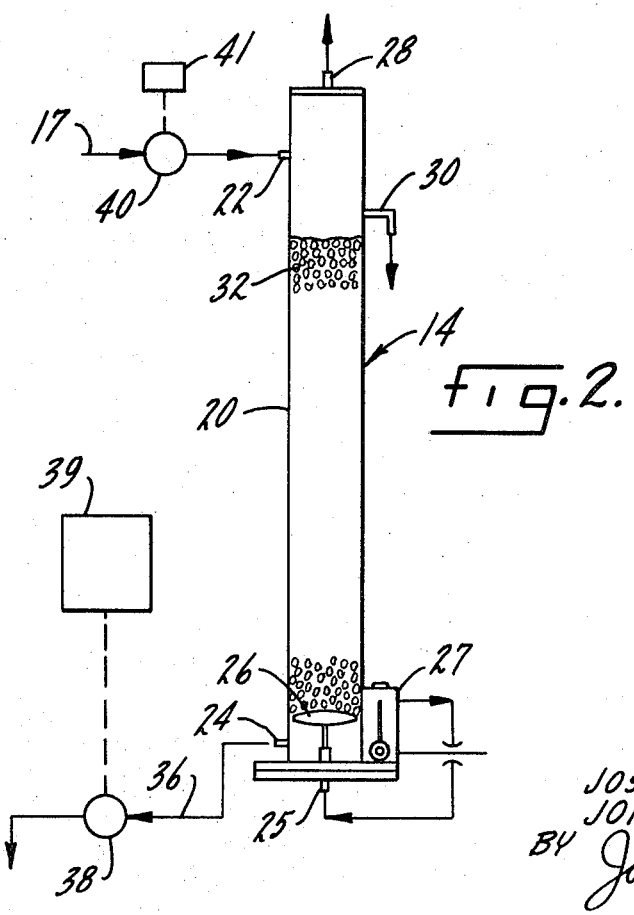
FIG. 2 is a diagrammatic showing of the gas scrubber portion of the invention.

As best seen in FIG. 2, gas scrubber 14 comprises a lucite column 20 having an influent fitting 22 communicating with an upper portion thereof and an effluent fitting 24 communicating with a lower portion thereof. Also provided is a gas inlet fitting 25 extending through the bottom end of column 20, having a gas diffuser 26 attached thereto and positioned a short distance above the bottom end of column 20. Diffuser 26 has an outside diameter slightly less than the inside diameter of column 20. A conventional flow meter 27 may be provided to adjust the rate of gas flow from a source of gas (not shown) through diffuser 26 into column 20. A gas vent 28 is provided through the top end of column 20 and an overflow vent 30 is provided through the side wall of column 20 spaced a distance form the top thereof. Column 20 is packed with a packing material 32 such that packing 32 extends from the top of gas diffuser 26 to about one-half inch below over flow vent 30. Packing 32 is preferably of an inert material (i.e., ¼-inch type 316 stainless steel Rasching-Rings). Effluent conduit 17 of column 12 is connected at its free end to fitting 22 and thus acts as the influent conduit for gas scrubber 14. A source of inert gas (i.e., nitrogen) is in communication with gas diffuser 26. Conduit 36 is attached to effluent fitting 24 and has a conventional conductivity cell 38 and conductivity measuring instrument 39 associated therewith to measure the conductivity of the gas scrubber effluent. A conductivity cell 40 and conductivity measuring instrument 41, associated with conduit 17, is also provided to measure the conductivity of the gas scrubber influent.

In operation, packing 32 is initially throughly cleansed using a detergent or solvent followed by hot 10 percent citric acid to remove oil and corrosion products. column 20 is then packed with packing 32 such that packing 32 extends from the top of diffuser 26 to about one-half inch below over flow vent 30. With the analyzer components and conduits arranged as in FIG. 1, the sample liquid is allowed to pass through analyzer 10 prior to initiating bubbling of the gas through column 20, until the conductivity of the effluent from column 12 equals the conductivity of the effluent from column 20. At this time the sample flow rate is adjusted so that a small amount of sample continuously exits through overflow vent 30 to ensure that the liquid level is always above the top of packing 32. The bubbling of gas through column 20 is then initiated. The gas may be any inert gas (i.e., pre-purified nitrogen). Conductivity readings taken at the scrubber influent by instrument 41 indicate the acid conductivity of the scrubber influent and conductivity readings taken at the effluent by instrument 39 indicate the acid conductivity of the scrubber effluent. The conductivity of the scrubber effluent is the true acid conductivity of the sample with the carbon dioxide removed. If pure nitrogen gas is not available then the conductivity of the scrubber effluent must be reduced by a blank value because of the conductivity added thereto by carbon dioxide contained within the nitrogen gas bubbled through column 20. The blank value due to impurities in the nitrogen will vary with the grade of gas used. Pre-purified nitrogen will give the lowest effluent conductivity and will allow the scrubber to be used with very low carbon dioxide concentrations. The packing 32 increases the surface area within column 20 and thereby increases the rate at which the nitrogen gas can replace the carbon dioxide gas dissolved within the sample by mechanical action. Carbon dioxide and nitrogen exit from column 20 through vent 28.

Figure 3:
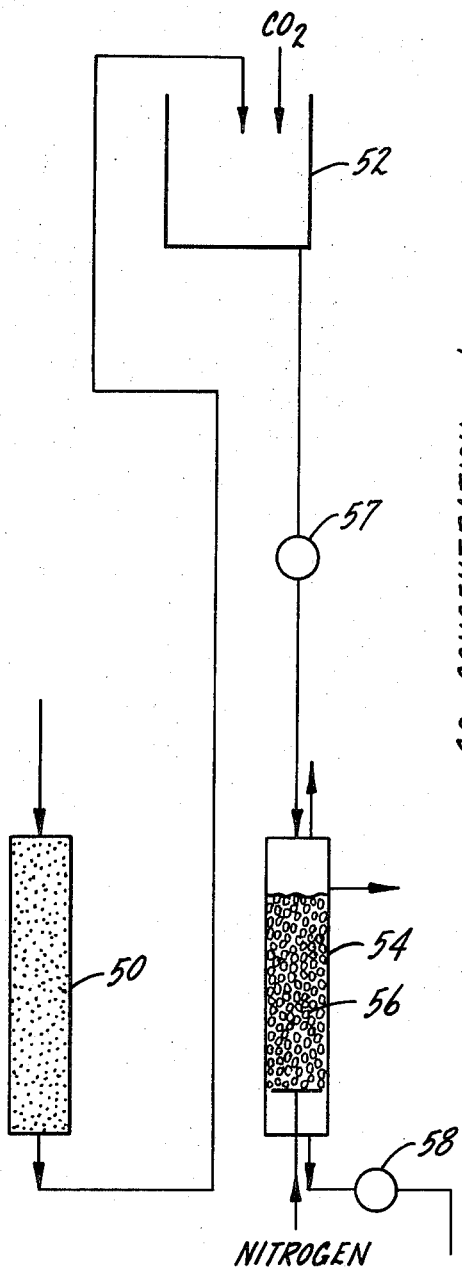
FIG. 3 is a schematic showing of a testing apparatus used to compare the present invention with the prior art.

A laboratory test was conducted to compare the ability to strip carbon dioxide from a liquid test sample of Beckman Model CH-33 with that of the present invention. Apparatus was assembled as schematically illustrated in FIG. 3. The test apparatus included a column of resin 50, a storage tank 52 having means to add carbon dioxide to the liquid therein, and a gas scrubber 54 including a column 56 having a means to bubble pre-purified nitrogen up therethrough. Conductivity measuring instruments 57 and 58 were positioned at the influent and effluent of gas scrubber 54 respectively. Resin 50 was not cation resin as used in Beckman Model CH-33 and as disclosed in the present invention but was a mixture of cation and anion resin to assure high purity feedwater to the scrubber. The initial test run was conducted with the apparatus hooked up as in FIG. 3 with column 56 void of any packing. Water from the laboratory was passed through resin column 50 into storage tank 52 where carbon dioxide gas was bubbled therethrough. The water from storage tank 52 was then permitted to flow through gas scrubber 54 at a rate of 200 ml./min.. The pre-purified nitrogen flow rate through column 56 was kept at a constant 4 CFH. The conductivity of the gas scrubber influent was measured at instrument 57 as 3 umho and the conductivity of the gas scrubber effluent was measured as 2 umho. A second run was made using the same apparatus, the same feedwater flow rate, and the same nitrogen flow rate but with column 56 packed with ¼-inch type 316 stainless steel Raschig-Rings in accordance with the present invention. The conductivity of the gas scrubber influent was measured at instrument 57 as 3 umho and the conductivity of the gas scrubber effluent was measured as 0.30 umho. It can therefore be seen that packing column 56 as disclosed in the description of the preferred embodiment significantly increases the quantity of carbon dioxide stripped from the gas scrubber influent. The blank value of the nitrogen used for this test was estimated at 0.12 umho.

Figure 4:
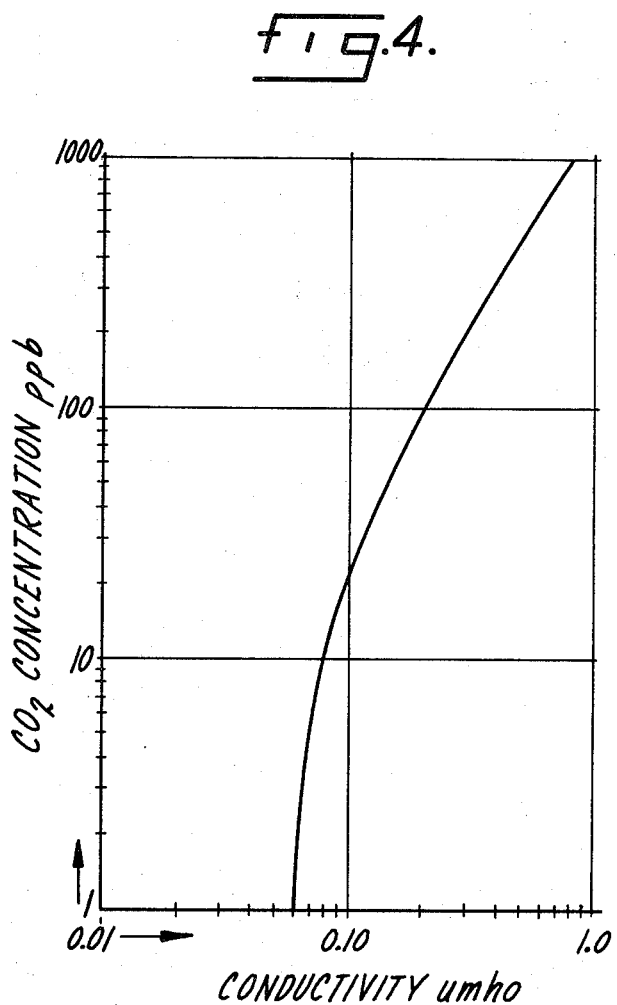
FIG. 4 is a graph showing the relationship of various carbon dioxide concentrations to solution conductivity.

The above described condensate analyzer has many applications, two of which will be discussed immediately below. As discussed above air leaks in a steam generating system have several detrimental effects on the system. Since air contains carbon dioxide the analyzer 10 may be used to detect the quantity of carbon dioxide in a condensate sample taken from the demineralizer influent which information may be used to detect the presence of air leaks. To accomplish this end a sample is taken from the demineralizer influent and passed through analyzer 10 in a similar manner as discussed immediately above. The cation conductivity of the influent and effluent are measured by instruments 41 and 39 respectively. By subtracting the effluent conductivity from instrument 39 from the conductivity of the scrubber influent, as measured by instrument 41, the conductivity due to dissolved carbon dioxide contained in the sample is determined. From the carbon dioxide conductivity curve of FIG. 4 the quantity of carbon dioxide in the test sample is readily determined (i.e., a conductivity of 0.10 umhos indicates approximately 20 ppb of dissolved carbon dioxide is in the sample). The presence of a large quantity of dissolved carbon dioxide in the system indicates an air leak.

Condensate analyzer 10 may additionally be used to determine when the anion resin in a demineralizer is dangerously exhausted. As discussed above carbonate ions and dissolved carbon dioxide in the condensate are not particularly harmful to the steam generation system whereas the presence of chloride ions, sulfate ions and silicate ions may substantially reduce the efficiency of the system. Therefore, it is not as significant to merely determine the conductivity of the demineralizer influent and effluent including carbon dioxide as it is to determine the conductivity of the demineralizer influent and effluent without dissolved carbon dioxide. By comparing the true acid conductivity of the demineralizer influent and effluent the present ability to remove anions may be determined. If the true acid conductivity of the influent and effluent are substantially equal the anion resin is dangerously exhausted.

Various modifications are contemplated and may obviously be resorted to those skilled in the art without departing from the spirit and scope of the invention, as hereinafter defined by the appended claims, as only a preferred embodiment thereof has been disclosed.

We claim:

1. A method of detecting the presence of air leaks in a stream generating system for electrical power generation, comprising the steps of:
    a. taking a test sample of condensate from the system upstream from the demineralizer;
    b. passing said condensate sample through a first column containing cation resin;
    c. measuring the conductivity of the effluent from said first column;
    d. passing the effluent from said first column through a second column containing an inert packing material while bubbling inert gas therethrough so as to scrub carbon dioxide dissolved therein;
    e. measuring the conductivity of the scrubbed effluent from same second column; and
    f. comparing the conductivity of step (c) with the conductivity of step (e) so as to detect the presence of dissolved carbon dioxide.

2. The method as defined in claim 1 wherein said inert packing material being ¼-inch type stainless steel Rachig-Rings.

3. The method as defined in claim 1 wherein said inert gas being prepurified nitrogen.

4. A method determining whether the anions resin within a demineralizer is dangerously exhausted, comprising the steps of:
    a. taking a first test sample from the demineralizer influent;
    b. passing the first test sample through a column containing cation resin;
    c. passing the effluent from step (b) through a column containing an inert packing material while bubbling inert gas therethrough so as to scrub carbon dioxide dissolved therein;
    d. measuring the conductivity of the effluent from step (c);
    e. taking a second test sample from the demineralizer effluent;
    f. passing the second test sample through a column containing cation resin;
    g. passing the effluent from step (f) through a column containing inert packing material while bubbling an inert gas therethrough so as to scrub carbon dioxide dissolved therein;
    h. measuring the conductivity of the effluent from step (g); and
    i. comparing the conductivity from step (d) with the conductivity from step (h) so as to determine the ability of the anion resin to remove anions from the demineralizer influent.

5. The method as defined in claim 4 wherein said inert packing material being ¼-inch type stainless steel Rachig-Rings.

6. The method as defined in claim 4 wherein said inert gas being prepurified nitrogen.

* * * * *

UNITED STATES PATENT OFFICE
CERTIFICATE OF CORRECTION

Patent No. 3,705,477                    Dated December 12, 1972

Inventor(s)    John F. Longo and Joseph H. Duff

It is certified that error appears in the above-identified patent and that said Letters Patent are hereby corrected as shown below:

Column 3, line 19 delete "form" and insert -- from --.

Column 5, line 26 after "to" insert -- by --.

Column 6, line 2 delete "same" and insert -- said --.

Column 6, line 11 after "method" insert -- of --.

Signed and sealed this 15th day of May 1973.

(SEAL)
Attest:

EDWARD M. FLETCHER, JR.                ROBERT GOTTSCHALK
Attesting Officer                       Commissioner of Patents